Figure 1:
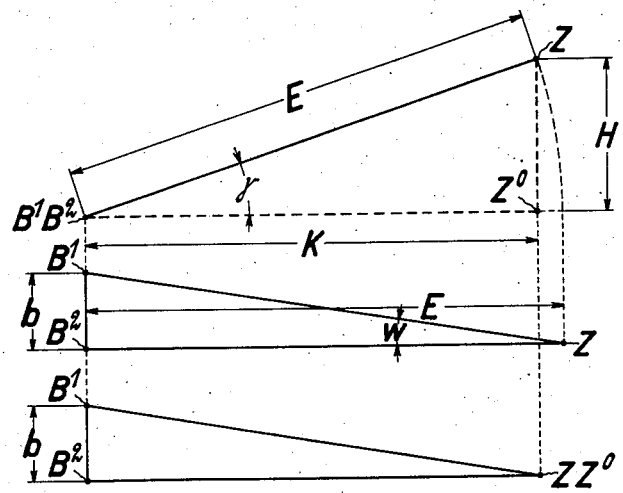

Aug. 9, 1927.  1,638,190
O. EPPENSTEIN
DEVICE FOR THE MECHANICAL MULTIPLICATION OF TWO FACTORS
Filed Aug. 14, 1926   3 Sheets-Sheet 1

Inventor:
Otto Eppenstein

Aug. 9, 1927.  
O. EPPENSTEIN  
1,638,190  
DEVICE FOR THE MECHANICAL MULTIPLICATION OF TWO FACTORS  
Filed Aug. 14, 1926  
3 Sheets-Sheet 2

Inventor:  
Otto Eppenstein

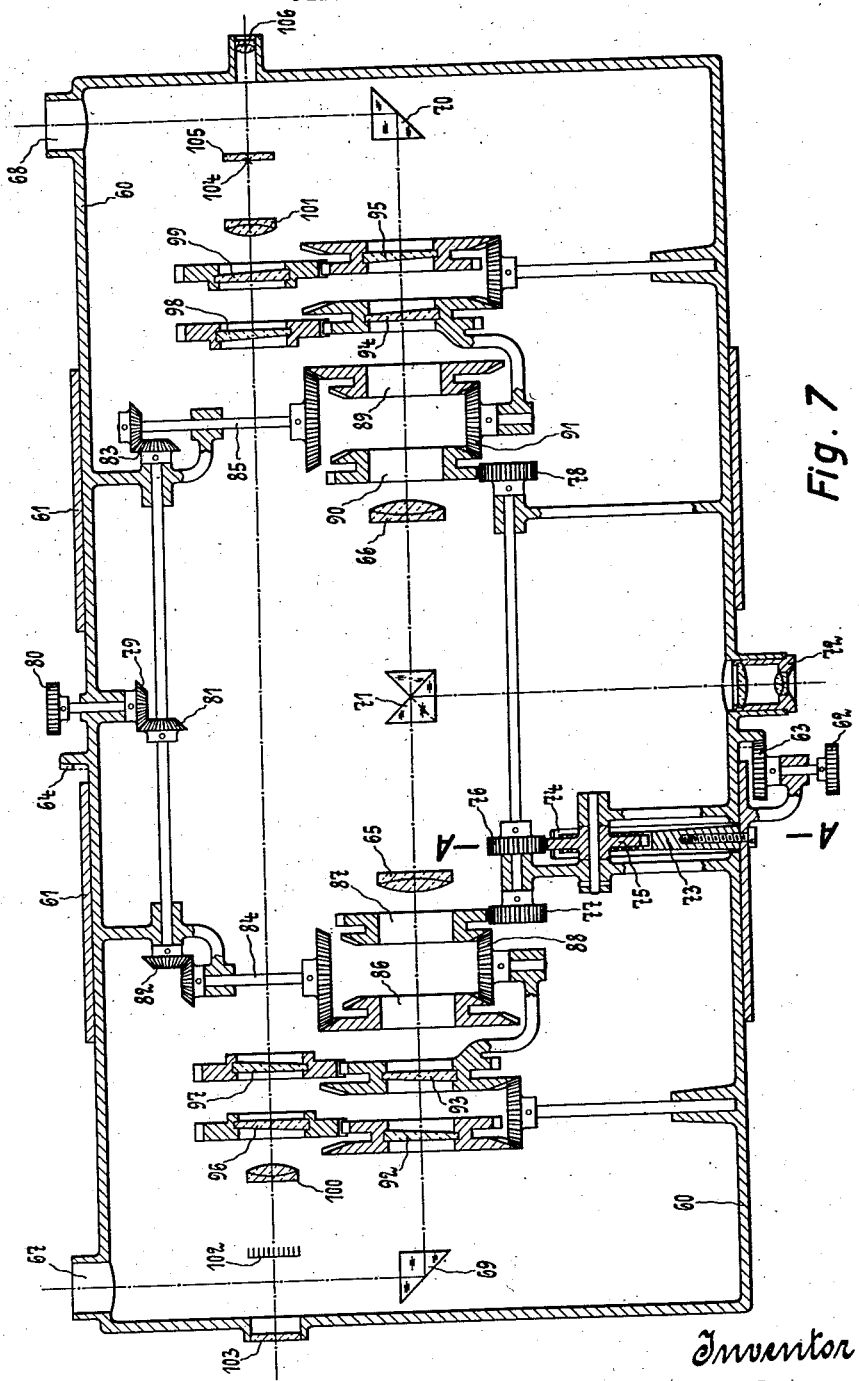

Patented Aug. 9, 1927.

1,638,190

UNITED STATES PATENT OFFICE.

OTTO EPPENSTEIN, OF JENA, GERMANY, ASSIGNOR TO THE FIRM CARL ZEISS, OF JENA, GERMANY.

DEVICE FOR THE MECHANICAL MULTIPLICATION OF TWO FACTORS.

Application filed August 14, 1926, Serial No. 129,259, and in Germany June 12, 1925.

The invention relates to a device for the mechanical multiplication of two variable factors and is based upon a reduction of the multiplication to addition and subtraction. As is well known, a variable $x$ may be represented by another variable, an auxiliary angle $\alpha$ in the form (1) $x = c_1 \sin \alpha$ wherein $c_1$ means a constant to be determined as requisite in the special case in question.

Likewise a variable $y$ may be represented by an angle $\beta$ and another constant $c_2$, suitably chosen, in the form (1$^a$) $y = c_2 \sin \beta$.

The product $x.y$ is, therefore, given by the equation (1$^b$) $x.y = c_1 \sin \alpha . c_2 \sin \beta$.

A transformation of the Equation 1$^b$ results in:

(2) $c_1 c_2 \sin \alpha \sin \beta = \frac{c_1 c_2}{2}[\cos (\alpha + \beta) - \cos (\alpha - \beta)]$ If for the sake of simplification the value $\frac{c_1 c_2}{2}$ be replaced by $c_3$ Equation 2 results in (2$^a$) $c_1 c_2 \sin \alpha \sin \beta = c_3 [\cos (\alpha + \beta) - \cos (\alpha - \beta)]$.

The product sought for is therefore represented as the difference of the two cosines of the total and the cosine of the difference of two auxiliary angles, whereby the said factors are proportional to the sine of one each of the auxiliary angles themselves. The mechanical multiplication is thus resolved into the three processes: representation of the total and the difference of two angles, representation of the cosine of angles and representation of the difference of such two cosines, i. e. into processes which can be carried out by well-known means.

According to the invention the device may be provided with two planet gears for representing the total and the difference of two auxiliary angles whose sine is proportional to one each of the factors. In order to be able to solve with such a device the problem set one may provide it with two rectilinearly displaceable sliding carriages which are guided in such a way that their displacements are proportional to the cosine of the total and the difference of the auxiliary angles. If these angular values be known themselves, the sliding carriages may be simply guided according to the definition of the cosine function. For representing the difference of two cosines a planet gear might again be used. Thereby, however, it would be necessary to previously convert the displacements of the sliding carriages, appearing as distances, into rotations which would necessitate an increase of the members of the device. The latter will become greatly simplified if on one of the sliding carriages be supported a toothed wheel, coacting with a rack coupled to the other sliding carriage. If thereby the directions of displacement of both sliding carriages be parallel to the rack, the angles of rotation of the toothed wheel represent the difference sought for and are thus proportional to the product of the values $x$ and $y$. It will then only be necessary to adapt a correspondingly gauged scale with an appertaining index in order to be able to easily read off the values of the product $x.y$ on the device.

The device may be particularly used to advantage if one of the factors $x$ or $y$ is already given as sine function of an angle. This case exists for instance if a one-stationary telemeter, admitting of measuring the parallactic angle at the target by means of displacing a deflection wedge, be used as an altimeter or chart-distance meter for aerial targets and the like.

Figure 2:
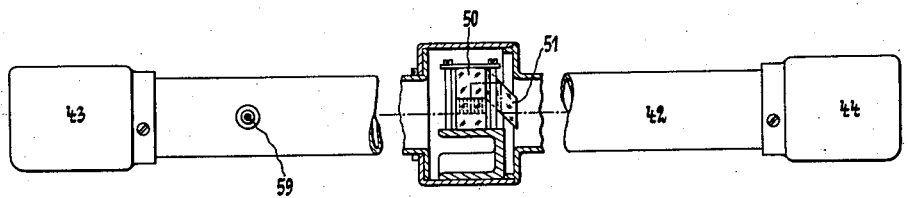
Figure 3:
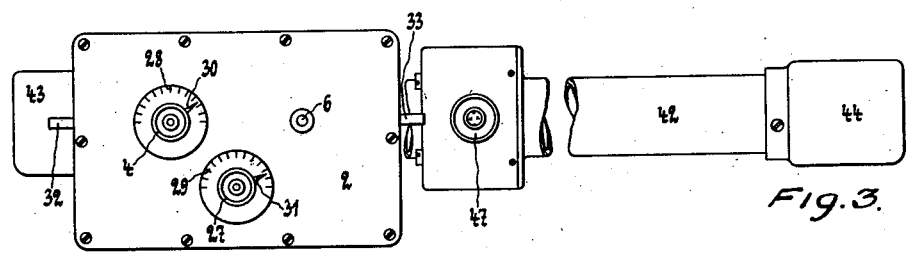
Figure 8:
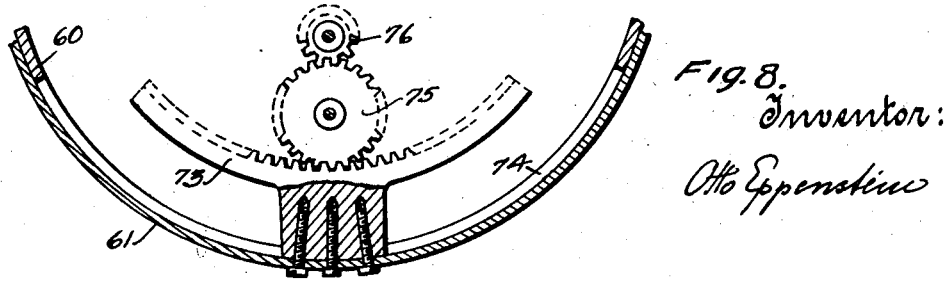
Figure 4:
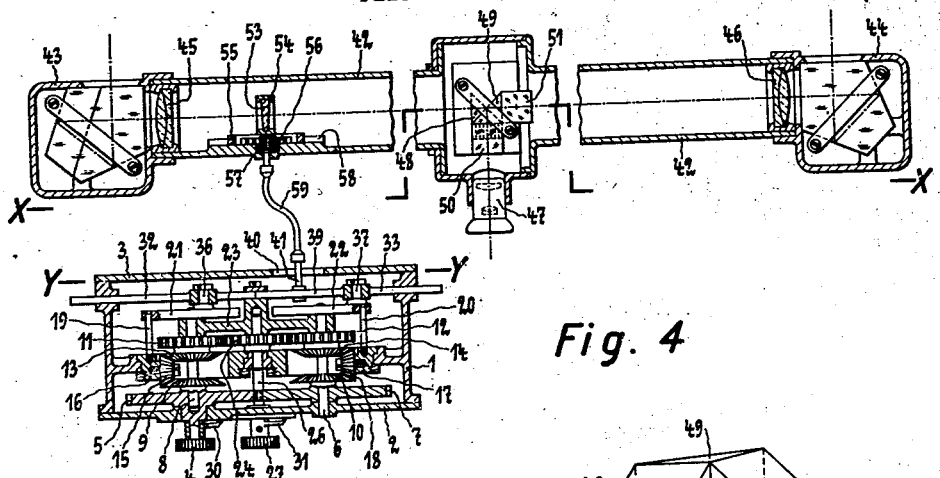
Figure 6:
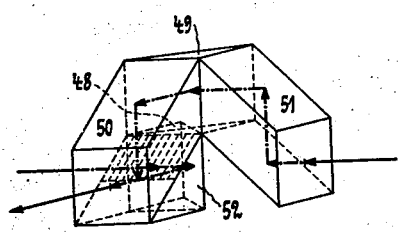
Figure 5:
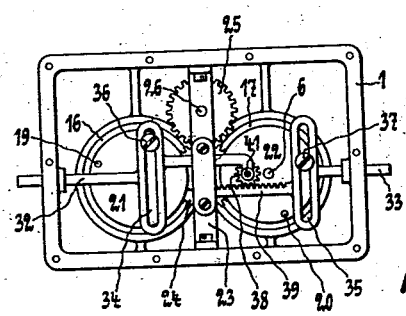

Fig. 1 of the accompanying drawing diagrammatically shows the theoretical basis for the constructional examples. In Figs. 2 to 6 is represented a constructional example of the invention. Fig. 2 is in elevation a section on the line X—X of Fig. 4, Fig 3 is a front view in elevation, Fig. 4 is a cross section in plan, Fig. 5 is in elevation a section on the line Y—Y of Fig. 4, Fig. 6 shows a perspective front view of a detail. Fig. 7 is in plan a section through a second constructional example, Fig. 8 is a section on the line A—A indicated in Fig. 7.

In Fig. 1 is represented the so-called sighting triangle $B^1 B^2 Z$ in elevation, in full size and in plan.

Let:

$b = B^1 B^2$ the base of a one-stationary telemeter,

E the distance of a target Z from the telemeter,

H the height of the target Z above the horizontal plane through the light-entrance apertures $B^1$ and $B^2$ of the telemeter, K the projection of the distance E on this horizontal plane, thus the chart-distance of the target Z, $w_0$ the parallactic angle at the target Z, $\gamma$ the angle of elevation between the horizontal and the sighting line of the telemeter.

The following equation holds good:

$$(3) \quad \tan w_0 = \frac{b}{E}$$

or, $w_0$ being generally very small, with sufficient approximation:

$$(3^a) \quad w_0 = \frac{b}{E}$$

$$(6^a) \quad w = c_8(\cos[\varphi + (90° - \gamma)] - \cos[\varphi - (90° - \gamma)])$$

there is:

$$(7^a) \quad w = c_9 \sin \varphi \sin (90° - \gamma)$$

and thus according to Equation 5 with invariable base $b$ $$(8^a) \quad \sin \varphi = \frac{c_{10}}{K}$$

i. e. the angle $\varphi$ is a scale for the chart-distance K of the target Z.

From the above deduction follows that it is possible to provide the new device for the mechanical multiplication of two factors to advantage with a one-stationary telemeter, which admits of measuring the parallactic angle at the target by displacing a deflection wedge. If the connection of the device to the telemeter be such that the said toothed wheel is so coupled to the deflection wedge that the displacement of the wedge takes place proportional to the rotation of the toothed wheel, the displacements of the deflection wedge correspond to the values mentioned in the Equations 6 and $6^a$ and the telemeter is thus adapted for the direct determination of the height H and the chart-distance K respectively of a target Z.

However, the device will be considerably more simplified by optically representing the differences of cosines of the Equations 6 and $6^a$. Such a construction of the invention can be based upon the following consideration. As is well known, the deflection which the luminous rays undergo in the plane of measurement of a one-stationary telemeter while As, however, $$(4) \quad E = \frac{H}{\sin \gamma} = \frac{K}{\sin(90° - \gamma)}$$

thus $$(5) \quad w_0 = x.y = \frac{b}{H} \sin \gamma = \frac{b}{K} \sin (90° - \gamma).$$

If the telemeter be provided with an arrangement for adjusting an auxiliary angle $\varphi$ and if the displacements $w$ of the deflection wedge (which are, as is well known, proportional to the angle $w_0$) be $$(6) \quad w = c_5[\cos(\varphi + \gamma) - \cos(\varphi - \gamma)],$$

according to Equation 2

$$(7) \quad w = c_6 \sin \varphi \sin \gamma$$

and consequently according to Equation 8 with invariable base $b$ $$(8) \quad \sin \varphi = \frac{c_7}{H},$$

i. e. the auxiliary angle $\varphi$ is a scale for the height H of the target Z. If, however, the displacements of the wedge be:

traversing a pair of rotary wedges (mostly denoted as a compensator) is proportional to the cosine of that angle through which each wedge is rotated out of the position of the maximum deflection of the compensator by arranging the wedges in such a way that the plane of the maximum deflection coincides with the plane of measurement. If the telemeter be provided with two such pairs of rotary wedges for adjusting the parallactic angle and if, furthermore, with each pair of wedges the edges be arranged in such a way that the compensators are counteracting with regard to their total effect, i. e. that the total effect is the difference of the single effects of the compensators, the total deflection, which is assumed to be denoted by $\kappa$, by supposing a uniform maximum deflection of all four single wedges of the compensators is $$(9) \quad \kappa = c_{11}[\cos(\varphi + \gamma) - \cos(\varphi - \gamma)],$$

if the two pairs of rotary wedges be so coupled to each other that the wedges of the one pair undergo a rotation about the total of the two auxiliary angles if the wedges of the other pair rotate by the difference of these angles. By adjusting therefore a target Z by means of the two compensators of the telemeter, whereby, however, the convergence of the rays must only be produced by the compensators, and therefore for a target Z lying at infinity with any desired angle of elevation the axes of the entering ray pencils must be parallel, according to the Equation 2 there again holds good

(10) $\kappa = c_{12} \sin \varphi \sin \gamma$ and consequently according to the Equation 5 with invariable base $b$ of the telemeter

(11) $\sin \varphi = \frac{c_{13}}{H}$.

If, however, the edges of the wedges of the compensators be so arranged that the deflections for attaining the total effect sum up, there results, after angle $\gamma$ having been replaced by $90° - \gamma$, the equation

(12) $\kappa = c_{15} \sin \varphi \sin (90° - \gamma)$, wherefrom according to the Equation 5 with invariable base $b$ of the telemeter there results the equation:

(11ª) $\sin \varphi = \frac{c_{16}}{K}$.

From the Equations 11 and 11ª results that in the marked construction of the device the auxiliary angle $\varphi$ is again a scale for the height H and the chart-distance K respectively of a target Z. The angle $\varphi$, however, is no scale for the distance E since according to the Equation 4

(4) $E = \frac{H}{\sin \gamma} = \frac{K}{\sin(90° - \gamma)}$.

However, in order to be able to measure the distance E besides H and K respectively, it is possible to provide the device with two additional pairs of rotary wedges which are so connected to one each of the pairs of rotary wedges, destined for adjusting the parallactic angle at the target, that the deflections caused by them are proportional in the plane of measurement of the luminous rays, emanating from a collimator, to the deflections caused by the other pairs of rotary wedges. As according to the Equation 3ª the parallactic angle $w_0$ is proportional to the reciprocal value of the distance E and as according to the Equations 6 and 6ª this angle is proportional to the total deflections $$\cos(\varphi + \gamma) - \cos(\varphi - \gamma) \text{ or } \cos[\varphi + (90° - \gamma)] - \cos[\varphi - (90° - \gamma)]$$

of the compensators destined for adjusting the parallactic angle, the total deflection of the second pair of compensators, which carries out rotations proportional to those of the first pair of compensators, is a scale for the distance E.

In the first example (Figs. 2 to 6) the device is located in a casing 1 which is closed by lids 2 and 3. In the lid 2 is supported a toothed wheel 5, rotatable by means of a milled head 4, and a bolt 6 which carries a like toothed wheel 7, engaging in the wheel 5. The latter is used as a bearing of a bolt 8 and is coupled to a bevel wheel 9, the toothed wheel 7 to a like bevel wheel 10. On the bolts 6 and 8 is rotatable a bevel wheel each 13 or 14 cast together with a spur wheel 11 or 12. A planet wheel 15, supported in a ring 16 rotatable within the casing 1, engages in the bevel wheels 9 and 13. In the same manner a planet wheel 18, supported in a ring 17, engages in the bevel wheels 10 and 14. The diameter of the planet wheels 15 and 18 is half as large as that of the bevel wheels 9 and 10 respectively. The rotations of the rings 16 and 17 are transmitted to the discs 21 and 22 by means of studs 19 and 20. These discs are fixed on the bolts 6 and 8, which are supported in a cross-shaped carrier 23 extending over the casing 1. In the carrier 23 is supported a spur wheel 24, resembling the spur wheels 11 and 12 and engaging in them. It further engages in a like spur wheel 25, which may be rotated from a milled head 27 with the aid of a bolt 26 supported in the casing 1. The rotation of the milled heads 4 and 27 is indicated by angular graduations 28 and 29 and pointers 30 and 31.

In the casing 1 and the carrier 23 are furthermore supported two slides 32 and 33, provided with slits 34 and 35 whose longitudinal direction is perpendicular to the direction of motion of the slides and in which are displaceable bolts 36 and 37, of which the bolt 36 is fixed on the disc 21 and the bolt 37 on the disc 22. The slide 32 carries a toothed wheel 38, which engages in a rack 39 provided on the slide 33 and which is rigidly connected to a bolt 41 passing through the lid 3 in a slit 40.

The telemeter connected to the device has a casing 42 with two prism heads 43 and 44 and two objectives 45 and 46 as well as an ocular 47. For uniting the imaging rays, emerging from the objectives 45 and 46, there is used a prism system. This prism system consists of two isosceles-rectangular prisms 48 and 49, two prisms of parallelogram-shaped cross section 50 and 51 and an isosceles-rectangular prisms 52. One half of that surface of the prism 50, which is cemented with the base-surface of the prism 52, is silvered. For adjusting the parallactic angle at the target is used a glass wedge 53 whose mount 54 rests on a sliding carriage 55 which is movable in the direction of the optical axis of the objective 45 by means of a rack 56 and a toothed wheel 57 in a carriage guide 58 provided on the casing 42. The toothed wheel 57 is coupled to the bolt 41 of the toothed wheel 38 by means of a flexible shaft 59.

The operation of the first example is as follows. The telemeter is to be adjusted in such a way that, when adjusting the initial position of the wedge 53, it shows the adjustment of an infinitely remote target for which, as is well known, the parallactic angle $w_0$ with each size of the base $b$ of the telemeter is equal to zero. Thereupon one sights at the target Z whose height H is to be ascertained by means of the actuating devices 4 and 27 in the following way. One rotates the milled head 4 by double the amount of the angle of elevation $\gamma$ out of its initial position and displaces the sliding carriage 55 with the wedge 53 by means of a rotation of the milled head 27, through an angle of $2\varphi$ until the telemeter shows the desired adjustment of the target Z.

The bevel wheels 9 and 10 rotate each with this adjustment through the angle $2\gamma$ in the opposite direction but the bevel wheels 13 and 14 rotate through the angle $2\varphi$ in the same direction. It is obvious that, assuming the said dimensions of the planet gears, the ring 16, rotated by the planet wheel 15, and at the same time the disc 21, coupled to this ring through the stud 19, with the same direction of rotation of the milled heads 4 and 27 undergo rotations through the angle $\varphi+\gamma$, while the ring 17, rotated by the planet wheel 18, and the disc 22, coupled to this ring through the stud 20, undergo rotations through the angle $\varphi-\gamma$. If the pins 36 and 37 be inserted into the discs 21 and 22 in such a way that at the initial position of the wedge 53 both slides are in the same direction at the dead point, the distance covered by the slide 32 with the said rotation of the milled heads 4 and 27 corresponds to $\cos(\varphi+\gamma)$ and that of the slide 33 to $\cos(\varphi-\gamma)$, and the motion of both slides 32 and 33 relatively to each other corresponds to the difference of both these values, and therefore to the expression $\cos(\varphi+\gamma)-\cos(\varphi-\gamma)$. These relative motions appear as rotations of the toothed wheel 38 to which the distances covered by the sliding carriage 55 in the carriage guide 58 are proportional. The height H sought for can directly be read off by means of the index 31 on the scale 29 in the case of a corresponding gauging of this scale.

In the second example (Figs. 7 and 8) the tubular casing 60 of the device is rotatable in a two-parted tube 61, which is assumed to be rigidly supported at the place of measurement, by means of a milled head 62 and a bevel wheel 63 as well as a bevel wheel gearing 64, about the optical axis of two objectives 65 and 66. The optical outfit of the telemeter is completed by two reflecting prisms 69 and 70 disposed behind light-entrance openings 67 and 68, a ray-uniting system 71 and an ocular 72. The tube 61 is provided with a toothed arc 73 which projects through an opening 74 into the casing 60 and engages in a spur wheel 75, actuating by means of a spur wheel 76 two spur wheels 77 and 78. In the casing 60 there is further supported a bevel wheel 79 which can be rotated from a milled head 80 and which actuates by means of a bevel wheel 81 two bevel wheels 82 and 83, each of which acts upon a bevel wheel gear 84 or 85. In front of the objective 65 are supported in the casing 60 two rims of gear wheel 86 and 87, rotatable about the optical objective axis, of which the rim 86 engages in the bevel wheel gear 84 and the rim 87 in the spur wheel 77. The rims of gear wheel 86 and 87, which are provided each with an additional bevel wheel gearing, are suplemented by a planet wheel 88 to a planet gear. In the same way there are rotatably supported in front of the objective 66 two rims of gear wheel 89 and 90, of which the former engages in the bevel wheel gear 85 and the other in the spur wheel 78. They form with a planet wheel 91 a planet gear. The angles of rotation described by the axes of the planet wheels 88 and 91 about the objective axes are transmitted to compensators, which consist of two glass wedges each 92, 93 and 94, 95 rotatable in opposite direction and each of which acts upon an additional glass wedge 96, 97, 98 or 99. The wedges 96 and 97 as well as the wedges 98 and 99 form two compensators, rotatable about the optical axis of two objectives 100 and 101. In the front focal plane of the objective 100 is provided a scale 102 which receives diffuse light from a ground glass 103 located in the casing 60. The objective 100 acts consequently as a collimator lens for the imaging rays emerging from scale 102 since all rays, emanating from one point of the scale 102, are parallel after having traversed the objective 100. In the rear focal plane of the objective 101 is disposed a ruled disc 105 with a mark 104 denoting the optical axis, which disc simultaneously lies in the front focal plane of an ocular 106.

The operation of the second example is as follows: In order to use the device it is necessary to adjust the rotary wedges 92, 93 and 94, 95 in such a way that their maximum deflection falls into the plane of measurement of the telemeter which is adjusted without the compensators to an infinitely remote target. The edges of the wedges of the compensators must, in addition, be so disposed that the compensators are counteractive with respect to the total effect, i.e. that the difference of the deflections caused by them becomes effective. The actuating devices 62 and 80 are to be handled as follows. By rotating the milled head 62 the telemeter is adjusted to the height H of the target Z at which the imaging rays entering the prisms 69 and 70 embrace the angle of elevation γ of the target relatively to a horizontal plane. The ratios of gear of the toothed wheels 73, 75, 76 and 77 are to be so chosen that with a proportion in size of 2 : 1 of the bevel wheel rims on the parts 86, 87 and 89, 90 to the planet wheels 88 and 91 the rims of gear wheel 87 and 90 rotate through the angle 2γ on the telemeter being adjusted in elevation. If a rotation of the milled head 80 through an angle φ entails a corresponding rotation of the rims of gear wheel 86 and 89 through the angle 2φ, the rotary wedges 92 and 93 as well as 94 and 95 rotate with the illustrated arrangement of the parts of the gear in pairs in opposite direction through the angles φ+γ and φ—γ, and it is obvious that according to the previously given deduction the angle φ is a scale for the height of the target H sought and may be read off on a scale similar to scale 79 of the first example and surrounding the milled head 80.

The compensators 96, 97 and 98, 99 participate in the rotations of the compensators 92, 93 and 94, 95. The scale 102 is imaged by the objectives 100 and 101 on the ruled disc 105 and the points of the scale 102, appertaining to the points of this image coinciding with the mark 104, are apart by distances, which are proportional to the total deflections of the compensators 96, 97 and 98, 99. With a corresponding gauging of the scale 102 it is therefore possible to directly read off on the mark 104 by means of the ocular 106 the value of the distance E of the target Z after the telemeter has been adjusted to this target Z.

Both devices described as examples may also easily be arranged for the determination of the chart-distance K of the target Z. For this purpose it is necessary to make such alterations of the gear as may be easily deduced from the formulae, deduced from those for the chart-distance K. For instance, in the second example the gears must be disposed in such a way that the total of the deflections caused by the compensators 92, 93 and 94, 95 becomes effective and that angle γ is replaced by 90°—γ, i. e. that the maximum deflection falls into a plane perpendicular to the plane of measurement of the telemeter.

I claim:

1. Telemeter comprising a casing, means for supporting the said casing and admitting of rotating the casing about a horizontal axis, in the casing being disposed two entrance prisms, two objectives located behind the entrance prisms and adapted to receive the rays having passed through the entrance prisms, an ocular, a prism system disposed between the objectives and the ocular and adapted to transmit to the ocular the rays having passed through the objectives, optical means interposed within the path of rays and adapted to displace relatively to each other the two images produced by the two objectives, two differential gears, each of which contains two members displaceably supported, and a third member displaceably supported, the third member coacting with the first and the second member and undergoing by these two members a displacement proportional to the algebraic sum of the displacements of these two members, two actuating devices, means for coupling the one actuating device to the first two members of the two differential gears so as to impart to these members like displacements in the same direction, means for coupling the other actuating device to the second two members of the two differential gears so as to impart to these members like displacements in the opposite direction, and means for coupling the one of the said actuating devices with the said optical means.

2. Telemeter comprising a casing, means for supporting the said casing and admitting of rotating the casing about a horizontal axis, in the casing being disposed two entrance prisms, two objectives located behind the entrance prisms and adapted to receive the rays having passed through the entrance prisms, an ocular, a prism system disposed between the objectives and the ocular and adapted to transmit to the ocular the rays having passed through the objectives, two refractive wedges, successively inserted between each objective and the said prism system and supported rotatable in the casing, means for coupling the two wedges so as to rotate in opposite sense, two differential gears, each of which contains two members, displaceably supported, and a third member, displaceably supported, the third member coacting with the first and the second member, and undergoing by these two members a displacement proportional to the algebraic sum of the displacements of these two members, two actuating devices, means for coupling the one actuating device to the first two members of the two differential gears so as to impart to these members like displacements in the same direction, means for coupling the other actuating device to the second two members of the two differential gears so as to impart to these members like displacements in the opposite direction, means adapted to rotate with an actuation of the second adjusting device the casing about the said horizontal axis, and means for coupling to the third member each of the two differential gears one each of the said refractive wedges.

3. Telemeter comprising a casing, means for supporting the said casing and admitting of rotating the casing about a horizontal axis, in the casing being disposed two entrance prisms, two objectives located behind the entrance prisms and adapted to receive the rays having passed through the entrance prisms, an ocular, a prism system disposed between the objectives and the ocular and adapted to transmit to the ocular the rays having passed through the objectives, two refractive wedges, successively inserted between each objective and the said prism system and supported rotatable in the casing, means for coupling the two wedges so as to rotate in opposite sense, two planet gears, of which each contains two crown wheels, rotatably supported in the casing, and a planet wheel engaging in the two crown wheels and being, on the one hand, rotatable about its own axis and, on the other hand, about the axis of rotation of the crown wheels, two actuating devices, means for coupling the one actuating device to one crown wheel each of the planet gears so as to impart to these crown wheels like displacements in the same direction, and means for coupling the other actuating device to the other two crown wheels so as to impart to these crown wheels like displacements in the opposite direction, means adapted to rotate with an actuation of the second adjusting device the casing about the said horizontal axis, and means for coupling to each of the two planet wheels one each of the said refractive wedges.

OTTO EPPENSTEIN.